United States Patent
Bobde et al.

(10) Patent No.: US 12,130,945 B2
(45) Date of Patent: Oct. 29, 2024

(54) SYSTEM AND METHOD FOR ANONYMIZING SENSITIVE INFORMATION IN LOGS OF

(71) Applicant: VMware LLC, Palo Alto, CA (US)

(72) Inventors: Anant L. Bobde, Pune (IN); Ankur Gupta, Jaipur (IN); Ishaan Banerjee, Mumbai (IN); Anima Jain, Pune (IN)

(73) Assignee: VMware LLC, Palo Alto, CA (US)

( * ) Notice: Subject to any disclaimer, the term of this patent is extended or adjusted under 35 U.S.C. 154(b) by 61 days.

(21) Appl. No.: 17/899,364

(22) Filed: Aug. 30, 2022

(65) Prior Publication Data
US 2024/0070322 A1    Feb. 29, 2024

(51) Int. Cl.
*G06F 21/62* (2013.01)

(52) U.S. Cl.
CPC .................. *G06F 21/6254* (2013.01)

(58) Field of Classification Search
CPC .................................................. G06F 21/6254
See application file for complete search history.

(56) References Cited

U.S. PATENT DOCUMENTS

| | | | | |
|---|---|---|---|---|
| 10,592,521 | B2 * | 3/2020 | Russell et al. | G06F 15/16 |
| 11,601,434 | B1 * | 3/2023 | Hornsby | H04L 63/0428 |
| 2009/0106594 | A1 | 4/2009 | Zhang et al. | G06F 11/07 |
| 2017/0099365 | A1 * | 4/2017 | Jain | H04L 67/561 |
| 2017/0149793 | A1 * | 5/2017 | Spertus et al. | H04L 63/105 |
| 2017/0329662 | A1 * | 11/2017 | Polychronis et al. | G06F 11/079 |
| 2020/0241941 | A1 * | 7/2020 | Gonczi | H04L 49/3018 |
| 2020/0382324 | A1 * | 12/2020 | Pierscieniak | H04L 9/3268 |
| 2021/0006542 | A1 * | 1/2021 | Myneni | H04L 63/20 |
| 2021/0133076 | A1 * | 5/2021 | Su | H04L 43/0858 |
| 2023/0106025 | A1 * | 4/2023 | Genchev | H04L 47/82 726/4 |
| 2023/0237402 | A1 * | 7/2023 | Kovacheva | G06F 9/547 705/7.27 |
| 2023/0394076 | A1 * | 12/2023 | Sharma | G06F 16/313 |

OTHER PUBLICATIONS

Omar Portillo-Dominguez, Vaness Ayala-Rivera, Towards an Efficient Log Data Protection in Software Systems through Data Minimization and Anonymization, 2019 7th International Conference in Software Engineering Research and Innovation (CONISOFT) (Year: 2019).*

Ruby Bhuvan Jain, A data masking utility to secure sensitive production data in non-production environment, Int. J. Knowledge Engineering and Data Mining, vol. 6, No. 2, 2019 (Year: 2019).*

* cited by examiner

*Primary Examiner* — Oleg Korsak
(74) *Attorney, Agent, or Firm* — King Intellectual Asset Management (57) ABSTRACT

System and method for anonymizing logs generated in applications running in a computing environment detects log data being generated in an application and compares the log data to a set of predefined search pattern policies to find sensitive information contained in the log data. The sensitive information contained in the log data is converted into anonymous information to produce anonymized log data within the application. The anonymized log data is then written to a destination.

20 Claims, 7 Drawing Sheets

SYSTEM AND METHOD FOR ANONYMIZING SENSITIVE INFORMATION IN LOGS OF

BACKGROUND

Logs are records about defined events that have occurred in software applications, which can be used for various purposes, such as application analysis, troubleshooting and auditing. Logs can contain various information, errors, warnings, texts, etc. The contents of the logs are defined by developers of applications within a system.

Enterprise applications running on on-premises or on cloud infrastructures often write verbose information in the log files. These log files usually reside in the same file system which is running the enterprise application. In these verbose log files, there may be information that might be sensitive in nature, and thus, poses vulnerability and compliance challenges.

Traditionally, enterprise applications rely on one of two approaches. The first approach involves using best programming practices followed by engineers to mask or limit the sensitive data written in log files. The big caveat for this approach is that there are risks of programming and human errors, which may make some sensitive information world-readable. Thus, applications relying on this approach may be non-compliant and susceptible for attacks.

The second approach involves extracting and removing sensitive data from the log files before the log files are available on a centralized logging platform for users. This approach is reactive, and thus, opens an attacking window with specific duration for cyberattackers to steal the sensitive information when it is in the source of truth, i.e., the original log files before the extraction and removal of the sensitive information.

SUMMARY

System and method for anonymizing logs generated in applications running in a computing environment detects log data being generated in an application and compares the log data to a set of predefined search pattern policies to find sensitive information contained in the log data. The sensitive information contained in the log data is converted into anonymous information to produce anonymized log data within the application. The anonymized log data is then written to a destination.

A computer-implemented method for anonymizing logs generated in applications running in a computing environment in accordance with an embodiment of the invention comprises monitoring logging activities of an application running in the computing environment, detecting log data being generated in the application, comparing the log data to a set of predefined search pattern policies to find sensitive information contained in the log data, converting the sensitive information contained in the log data into anonymous information to produce anonymized log data within the application, and writing the anonymized log data to a destination. In some embodiments, the steps of this method are performed when program instructions contained in a computer-readable storage medium are executed by one or more processors.

A system in accordance with an embodiment of the invention comprises memory and at least one processor configured to monitor logging activities of an application running in a computing environment, detect log data being generated in the application, compare the log data to a set of predefined search pattern policies to find sensitive information contained in the log data, convert the sensitive information contained in the log data into anonymous information to produce anonymized log data within the application, and write the anonymized log data to a destination.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
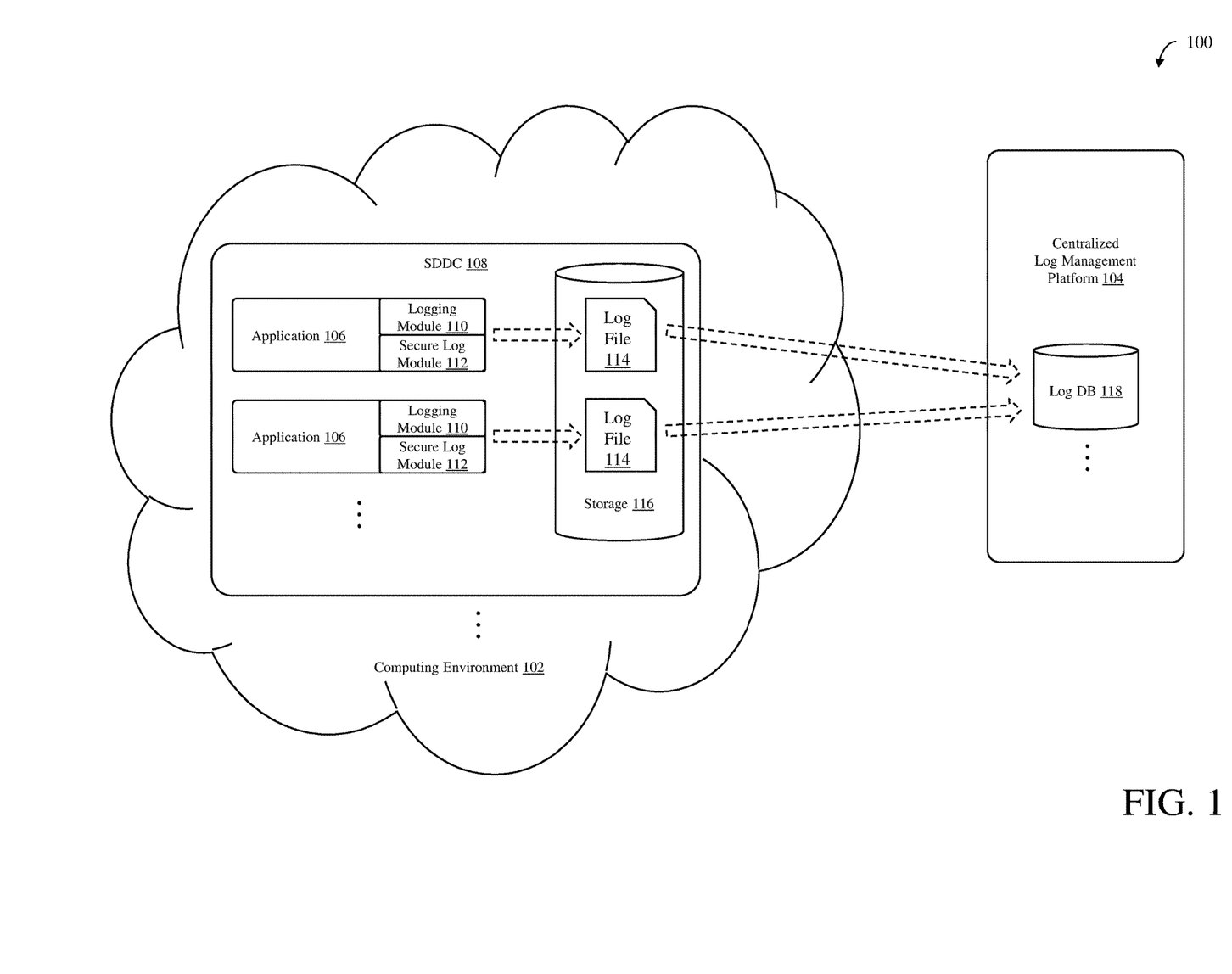
FIG. 1 is a diagram of a computing system in accordance with an embodiment of the invention.

FIG. 1 shows a computing system 100 in which embodiments of the invention may be implemented. The computing system 100 includes a computing environment 102 and a centralized log management platform 104. As illustrated, the computing environment 102 supports a number of software applications 106, which can be any type of applications that may provide services and microservices. As an example, the applications 106 may be modules or microservices of an enterprise application. The computing environment 102 can be an on-premises cloud computing environment, a public cloud computing environment or a hybrid cloud computing environment. In the illustrated embodiment, the applications are running in a software-defined data center 108, which is described in detail below. The computing environment 102 may include a number of SDDCs 108, which are supporting various software applications 106.

Each application 106 running in the SDDC 108 includes a logging module 110 that generates application log data, which may be referred to herein as logs, which are useful for application/system analysis, solving bugs, troubleshooting and auditing. Logs can contain information, errors, warnings, texts, etc., which can be used for these purposes. The contents of the logs are defined by developers of the applications. In an embodiment, the logging module 110 is based on Logback or Log4J logging framework.

Each application 106 running in the SDDC 108 also includes a secure log module 112, which operates to anonymize the logs generated by the logging module 110 to prevent sensitive information in the logs from being exposed to unauthorized entities. In an embodiment, the secure log module 112 is implemented to support Logback or Log4J logging framework. In addition, the secure log module 112 may be implemented as a plugin software installed in the application 106. The secure log module 112 is described in more detail below.

The logs from each application 106 are typically written to a log file 114 in storage 116 of the computing environment 102, which may be storage resources allocated to the SDDC 108. In some cases, the logs from each application 106 may be sent to another destination, such as a console to display the logs to a user.

The log files 114 may be sent to the centralized log management platform 104 to be stored in a log database (DB) 118, which can then be used for various operations, such as inspecting, searching, application/system analyzing, troubleshooting and auditing. The centralized log management platform 104 may be running in any computing environment. In an embodiment, the centralized log management platform 104 may be a service running in a public cloud. As an example, the centralized log management platform 104 may be based on Logz.io, ELK (Elastic Search, Logstash, Kibana) or SysLog.

Figure 2:
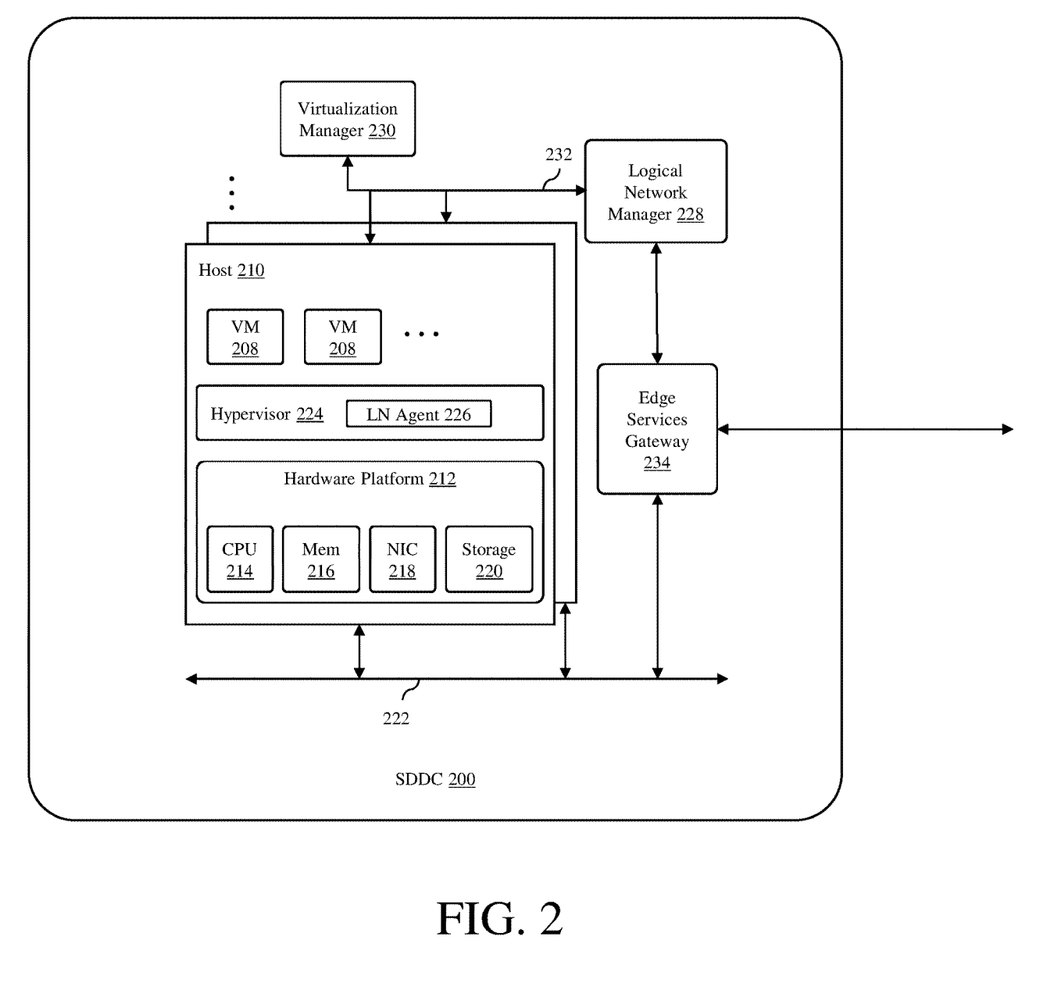
FIG. 2 is a diagram of a representative software-defined data center (SDDC) that may be implemented in the computing system shown in FIG. 1 in accordance with an embodiment of the invention.

Turning now to FIG. 2, a representative SDDC 200 that may be implemented in the computing system 100 in accordance with an embodiment of the invention is illustrated. Thus, the SDDC 200 is an example of the SDDCs 108 shown in FIG. 1.

As shown in FIG. 2, the SDDC 200 includes one or more host computer systems ("hosts") 210. The hosts may be constructed on a server grade hardware platform 212, such as an x86 architecture platform. As shown, the hardware platform of each host may include conventional components of a computing device, such as one or more processors (e.g., CPUs) 214, system memory 216, a network interface 218, and storage 220. The processor 214 can be any type of a processor commonly used in servers. The memory 216 is volatile memory used for retrieving programs and processing data. The memory 216 may include, for example, one or more random access memory (RAM) modules. The network interface 218 enables the host 210 to communicate with other devices that are inside or outside of the SDDC 200 via a communication medium, such as a network 222. The network interface 218 may be one or more network adapters, also referred to as network interface cards (NICs). The storage 220 represents one or more local storage devices (e.g., one or more hard disks, flash memory modules, solid state disks and/or optical disks), which may be used to form a virtual storage area network (SAN).

Each host 210 may be configured to provide a virtualization layer that abstracts processor, memory, storage and networking resources of the hardware platform 212 into virtual computing instances, e.g., virtual machines 208, that run concurrently on the same host. The software applications 106 shown in FIG. 1 may be running on the virtual computing instances 208. The virtual machines run on top of a software interface layer, which is referred to herein as a hypervisor 224, that enables sharing of the hardware resources of the host by the virtual machines. One example of the hypervisor 224 that may be used in an embodiment described herein is a VMware ESXi™ hypervisor provided as part of the VMware vSphere® solution made commercially available from VMware, Inc. The hypervisor 224 may run on top of the operating system of the host or directly on hardware components of the host. For other types of virtual computing instances, the host may include other virtualization software platforms to support those virtual computing instances, such as Docker virtualization platform to support "containers." In the following description, the virtual computing instances 208 will be described as being virtual machines.

In the illustrated embodiment, the hypervisor 224 includes a logical network (LN) agent 226, which operates to provide logical networking capabilities, also referred to as "software-defined networking" (SDN). Each logical network may include software managed and implemented network services, such as bridging, L3 routing, L2 switching, network address translation (NAT), and firewall capabilities, to support one or more logical overlay networks in the SDDC 200. The logical network agent 226 receives configuration information from a logical network manager 228 (which may include a control plane cluster) and, based on this information, populates forwarding, firewall and/or other action tables for dropping or directing packets between the virtual machines 208 in the host 210, other virtual machines on other hosts, and/or other devices outside of the SDDC 200. Collectively, the logical network agent 226, together with other logical network agents on other hosts, according to their forwarding/routing tables, implement isolated overlay networks that can connect arbitrarily selected virtual machines with each other. Each virtual machine may be arbitrarily assigned a particular logical network in a manner that decouples the overlay network topology from the underlying physical network. Generally, this is achieved by encapsulating packets at a source host and decapsulating packets at a destination host so that virtual machines on the source and destination can communicate without regard to underlying physical network topology. In a particular implementation, the logical network agent 226 may include a Virtual Extensible Local Area Network (VXLAN) Tunnel End Point or VTEP that operates to execute operations with respect to encapsulation and decapsulation of packets to support a VXLAN backed overlay network. In alternate implementations, VTEPs support other tunneling protocols such as stateless transport tunneling (STT), Network Virtualization using Generic Routing Encapsulation (NVGRE), or Geneve, instead of, or in addition to, VXLAN.

The SDDC 200 also includes a virtualization manager 230 that communicates with the hosts 210 via a management network 232. In an embodiment, the virtualization manager 230 is a computer program that resides and executes in a computer system, such as one of the hosts, or in a virtual computing instance, such as one of the virtual machines 208 running on the hosts. One example of the virtualization manager 230 is the VMware vCenter Server® product made available from VMware, Inc. In an embodiment, the virtualization manager is configured to carry out administrative tasks for a cluster of hosts that forms an SDDC, including managing the hosts in the cluster, managing the virtual machines running within each host in the cluster, provisioning virtual machines, migrating virtual machines from one host to another host, and load balancing between the hosts in the cluster.

As noted above, the SDDC 200 also includes the logical network manager 228 (which may include a control plane cluster), which operates with the logical network agents 226 in the hosts 210 to manage and control logical overlay networks in the SDDC 200. Logical overlay networks comprise logical network devices and connections that are mapped to physical networking resources, e.g., switches and routers, in a manner analogous to the manner in which other physical resources as compute and storage are virtualized. In an embodiment, the logical network manager 228 has access to information regarding physical components and logical overlay network components in the SDDC. With the physical and logical overlay network information, the logical network manager 228 is able to map logical network configurations to the physical network components that convey, route, and filter physical traffic in the SDDC 200. In one particular implementation, the logical network manager 228 is a VMware NSX® product running on any computer, such as one of the hosts or a virtual machine in the SDDC 200.

The SDDC 200 also includes a gateway 234 to control network traffic into and out of the SDDC 200. In an embodiment, the gateway 234 may be implemented in one of the virtual machines 208 running in the SDDC 200. In a particular implementation, the gateway 234 may be an edge services gateway. One example of the edge services gateway 234 is VMware NSX® Edge™ product made available from VMware, Inc.

Turning back to FIG. 1, some logs generated by the logging module 110 of each application 106 may contain sensitive information, which may pose vulnerability and compliance challenges. Applications become more susceptible to Common Vulnerabilities and Exposures (CVEs) due to logs containing certain sensitive information. Few examples of these CVEs are listed below.

a. CVE-2017-9615: Verbose logging stores admin credentials in a world-readable log file.
    b. CVE-2001-1528: Account number enumeration via inconsistent responses.
    c. CVE-2001-1483: Enumeration of valid usernames based on inconsistent responses.
    d. CVE-2004-2150: User enumeration via discrepancies in error messages.
    e. CVE-2007-5172: Program reveals password in error message if attacker can trigger certain database errors.
    f. CVE-2018-1999036: SSH password for private key stored in build log.
    g. CVE-2007-1409: Direct request to library file in web application triggers pathname leak in error message.
    h. CVE-2005-0603: Malformed regex syntax leads to information exposure in error message.
    i. CVE-2004-2268: Password exposed in debug information.

In addition, there are guidelines or rules laid down by General Data Protection Regulation (EU) 2016/679 (GDPR) and Federal Risk and Authorization Management Program (FedRAMP) for data protection, which require not writing certain additional data in logs that may lead to some attacks. The GDPR is a regulation in European Union on data protection and privacy in EU and the European Economic Area (EEA). It also addresses the transfer of personal data outside the EU and EEA areas. The GDPR's primary aim is to enhance individuals' control and rights over their personal data and to simplify the regulatory environment for international business. Superseding the Data Protection Directive 95/46/EC, the regulation contains provisions and requirements related to the processing of personal data of individuals (formally called data subjects in the GDPR) who are located in the EEA, and applies to any enterprise, regardless of its location and the data subjects' citizenship or residence, that is processing the personal information of individuals inside the EEA. The FedRAMP was established in 2011 to provide a cost-effective, risk-based approach for the adoption and use of cloud services by the federal government. FedRAMP empowers agencies to use modern cloud technologies, with an emphasis on security and protection of federal information.

Thus, logs generated by the logging module 110 of each application 106 should not contain sensitive information to alleviate CVEs and be compliant to relevant guidelines or regulations. However, relying on best programming practices software or on cleaning the log files of sensitive information has many issues, as described above. The secure log module 112 resolves the issues of these approaches by monitoring the logging activities of the logging module 110 to find sensitive information in log data to be written or output to a destination, such as the log file 114 or a console, and anonymize the sensitive information in the log data before the log data is written or output to the destination. Thus, the secure log module operates on log data before it is sent to the destination. Consequently, the log data with the sensitive information is not persistently stored prior to being anonymize.

The sensitive information found in the log data is then masked and converted into anonymous information, such as "######" or any characters that do not contain any information with respect to the original sensitive information of the log data. Once the sensitive information is converted, the anonymized log data is written to the destination, e.g., the log file 114, which can then be collected in the centralized log management platform 104. Consequently, the sensitive information is not world-readable at the storage 116 of the computing environment 102 or at the log database 118 of the centralized log management platform 104, making the system FEDRAMP and GDPR complaint and immune to vulnerabilities.

In an embodiment, the secure log module 112 is programmed to crawl through the log data being logged during logging activities of the logging module 110 before the log data is written or output to a destination, such as the log file 114. Every word and character in the log data is read to match sensitive information in the log data with a set of predefined log search pattern policies, which may include regular expressions or regexes. These log search pattern policies could be a mix of system-defined log search pattern policies and user-defined log search pattern policies. The log search pattern policies may be included in a policy file, which may be a JavaScript Object Notation (JSON) file.

The matched sensitive information is then masked and converted into anonymous information, such as "######" or any characters that do not contain any information with respect to the original sensitive information in the log data. Once the sensitive information is converted, the anonymized log data is written to the destination, e.g., the log file 114, which can then be collected in the centralized log management platform 104. Thus, as noted above, the sensitive information is not world-readable at the storage 116 of the computing environment 102 or at the log database 118 of the centralized log management platform 104, making the system FEDRAMP and GDPR complaint and immune to vulnerabilities.

An example of a policy file with log search pattern policies ("sensitiveInfoList") that can be used by the secure log module 112 is shown below.

```
sensitiveInfoList:
  - name: EMAIL
    regex: [a-zA-Z0-9.!#$%&'*+/=?^_`{|}~-]+@[a-zA-Z0-9](?:[a-zA-Z0-9-]{0,61}[a-zA-Z0-9])?(?:\.[a-zA-Z0-9](?:[a-zA-Z0-9-]{0,61}[a-zA-Z0-9])?)*
    maskType: Digest
  - name : ip
    regex: (ip address\ip)=>(?<mask>(\d{1,3}\.){3}\d{1,3})
    maskType: Digest
  - name : CREDIT_CARD
    regex: [0-9]{4}\\s[0-9]{4}\\s[0-9]{4}\\s[0-9]{4}
    maskType: Digest
```

This JSON file defines three regular expressions, email, Internet Protocol (IP) address and credit card. The "email" regular expression is used to detect and mask any information in log data that is following a pattern of an email address. For example, John.doe@gmail.com will be masked as "#######". The "ip" regular expression is used to detect and mask any information in log data that is following a pattern of an IP address. For example, IP address of 10.102.30.132 will be masked as "#######". The "credit card" regular expression is used to detect and mask any set of numbers in log data that is following a pattern of a credit card number. For example, credit card number 1234 4321 5678 2456 will be masked as "#######".

Figure 3A:
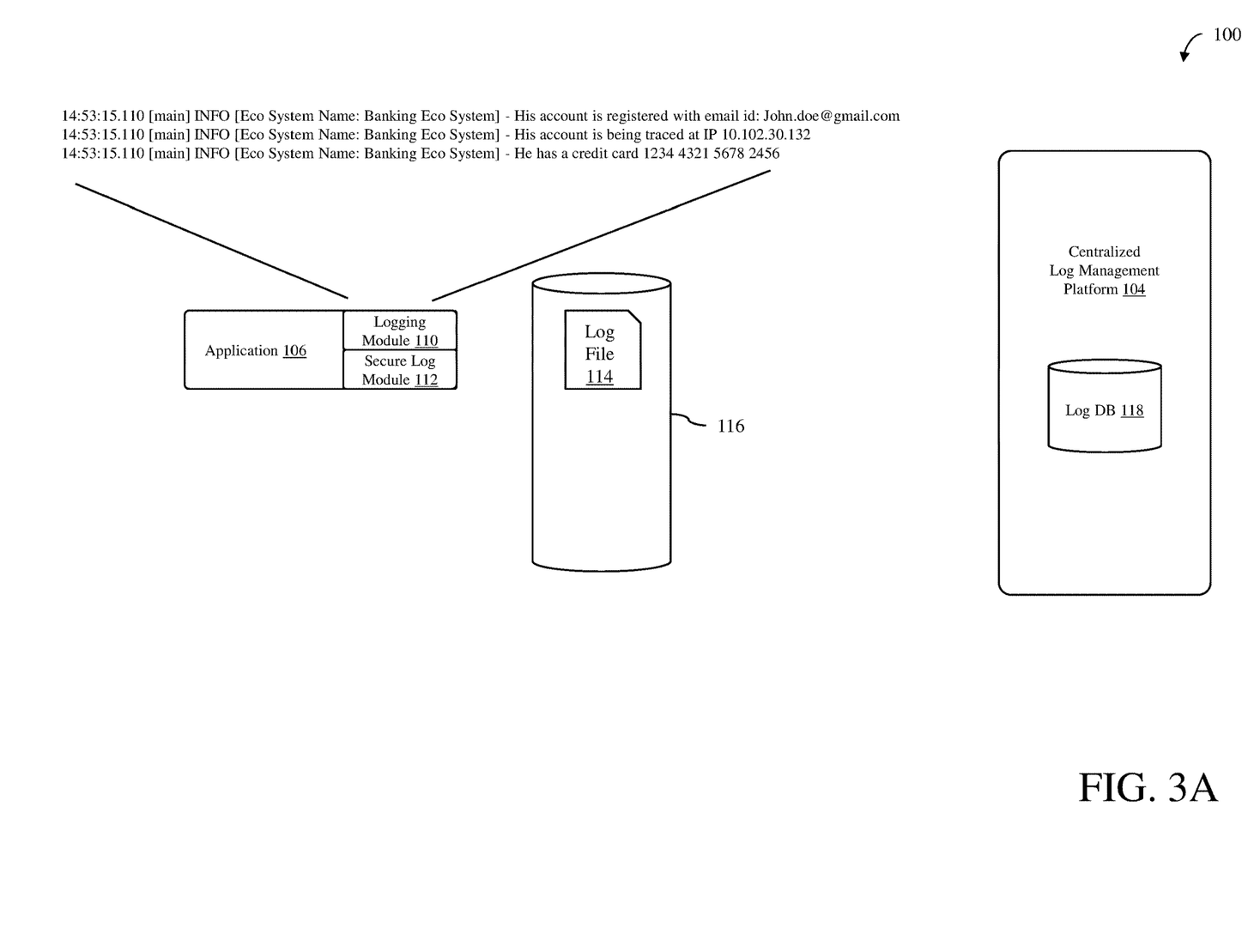
FIGS. 3A-3C illustrate an example of a logging operation in the computing system shown in FIG. 1 in accordance with an embodiment of the invention.
Figure 3B:
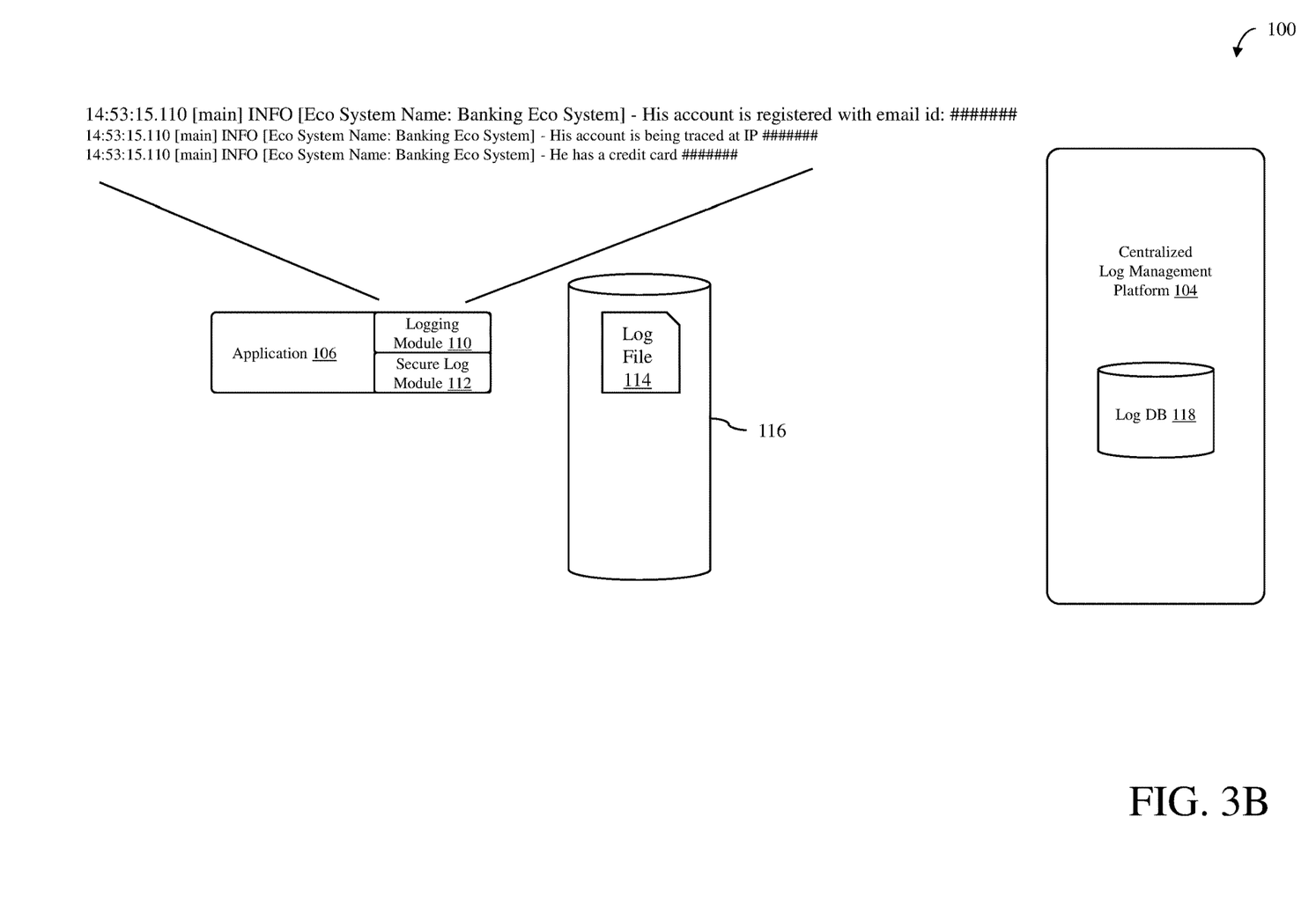
Figure 3C:
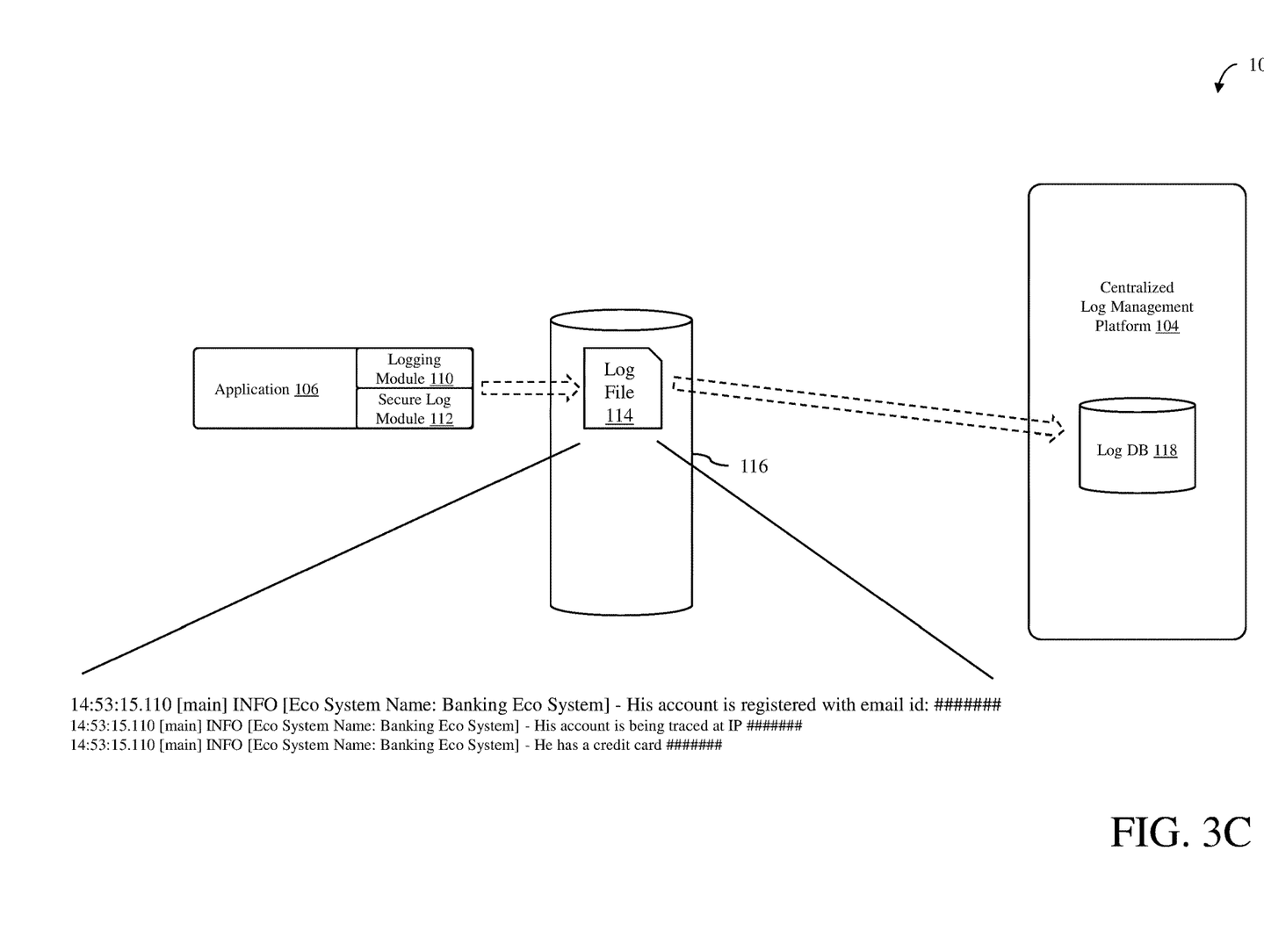

The logging operation in the computing system 100 is described using an example illustrated in FIG. 3A-3C, which show log data from one of the applications 106 being written to the associated log file 114, which is then sent to the centralized log management platform. In these figures, some of the components of the computing system 100 are not shown. In FIG. 3A, the logging module 110 of the application 106, as part of its logging activities, is generating the following three log entries: (1) 14:53:15.110 [main] INFO [Eco System Name: Banking Eco System]—His account is registered with email id: John.doe@gmail.com, (2) 14:53:15.110 [main] INFO [Eco System Name: Banking Eco System]—His account is being traced at IP 10.102.30.132, and (3) 14:53:15.110 [main] INFO [Eco System Name: Banking Eco System]—He has a credit card 1234 4321 5678 2456. Thus, these three log entries include an email address, an IP address and credit card number, which are all sensitive information. However, at this moment in time, the log entries have not been written to the log file 114.

Since the logging module 110 is monitored by the secure log module 112, the log entries being generated are detected and the characters contained the log entries are compared to the predefined log pattern search policies, e.g., the log pattern search policies contained in a log policy file, by the secure log module 112. As a result, the email address "John.doe@gmail.com" in the first log entry, the IP address "10.102.30.132" in the second log entry, and the credit card number "1234 4321 5678 2456" in the third log entry will be found to be sensitive information by the secure log module 112. In addition, these three found sensitive information will be anonymized by converting the sensitive information into anonymous information, such as "#######", as illustrated in FIG. 3B.

After the sensitive information has been anonymized, the anonymized log entries are written to the log file 114, as illustrated in FIG. 3C. The log file 114 with the anonymized log entries can then be sent to the centralized log management platform 104. Since the sensitive information in log data has been removed before being written to the log file 114, cyberattackers cannot get the sensitive information from the log file 114 or from the centralized log management platform 104. In addition, the log file 114 is now compliant to FedRAMP and GDPR, as well as not being susceptible to CVEs.

Figure 4:
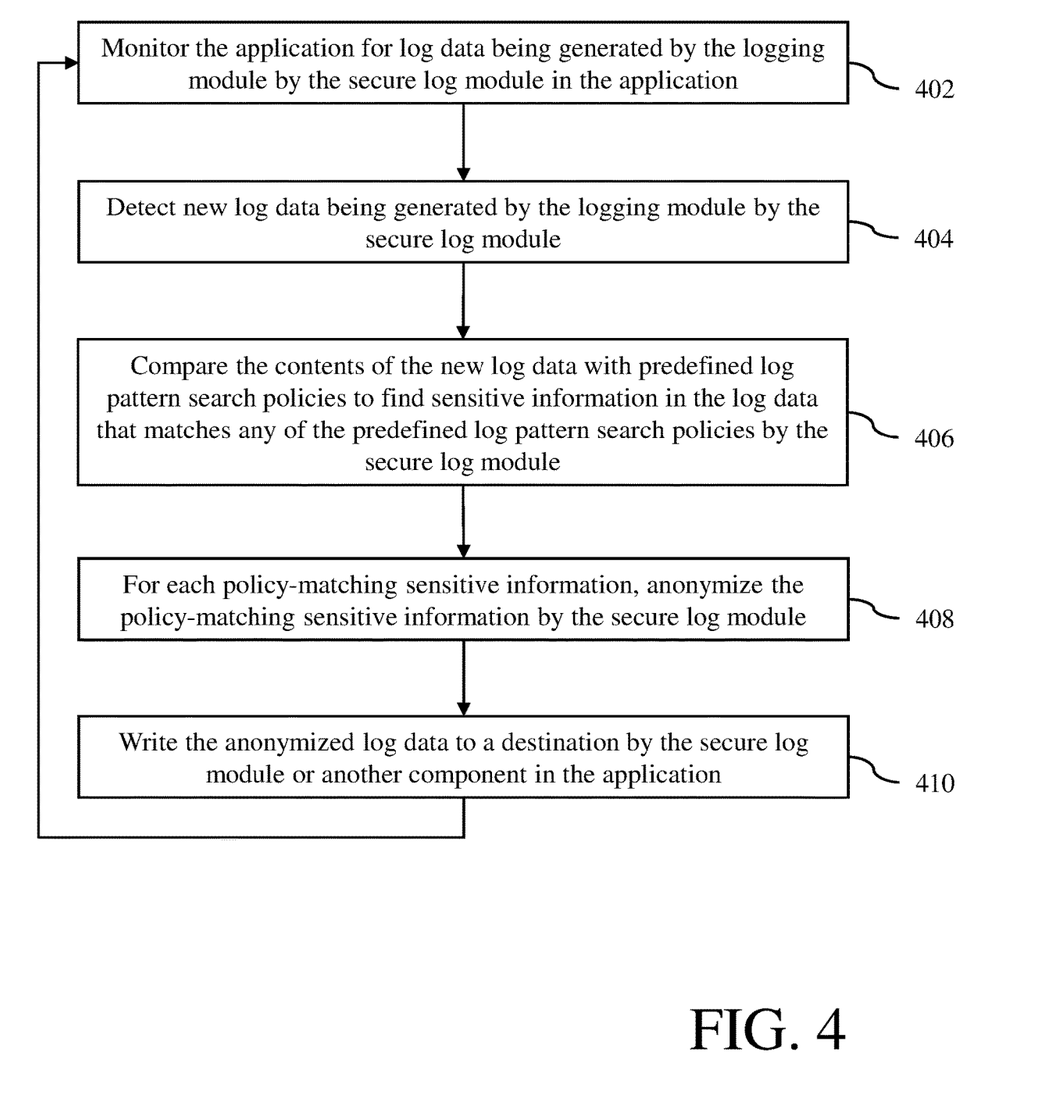
FIG. 4 is a flow diagram of a process of generating anonymized logs of an application running in the computing system shown in FIG. 1 in accordance with an embodiment of the invention.

Turning now to FIG. 4, a flow diagram of a process of generating anonymized logs of an application 106 running in the computing system 100 in accordance with an embodiment of the invention is shown. The process begins at step 402, where the application 106 is monitored by the secure log module 112 in the application for log data being generated by the logging module 110 of the application. Next, at step 404, new log data being generated by the logging module is detected by the secure log module.

Next, at step 406, the contents of the new log data are compared with predefined log pattern search policies to find sensitive information in the log data that matches any of the predefined log pattern search policies by the secure log module 112. As an example, the sensitive information may include email addresses, IP addresses and/or credit card numbers.

Next, at step 408, for each policy-matching sensitive information, the policy-matching sensitive information is anonymized by the secure log module. In an embodiment, the policy-matching sensitive information expression is converted to an anonymized expression, such as "######".

Next, at step 410, the anonymized log data is written to a destination, such as a log file 114 or a console, by the secure log module or another component in the application. The log file 114 can then be sent to the centralized log management platform 104. The process then returns to step 402.

Figure 5:
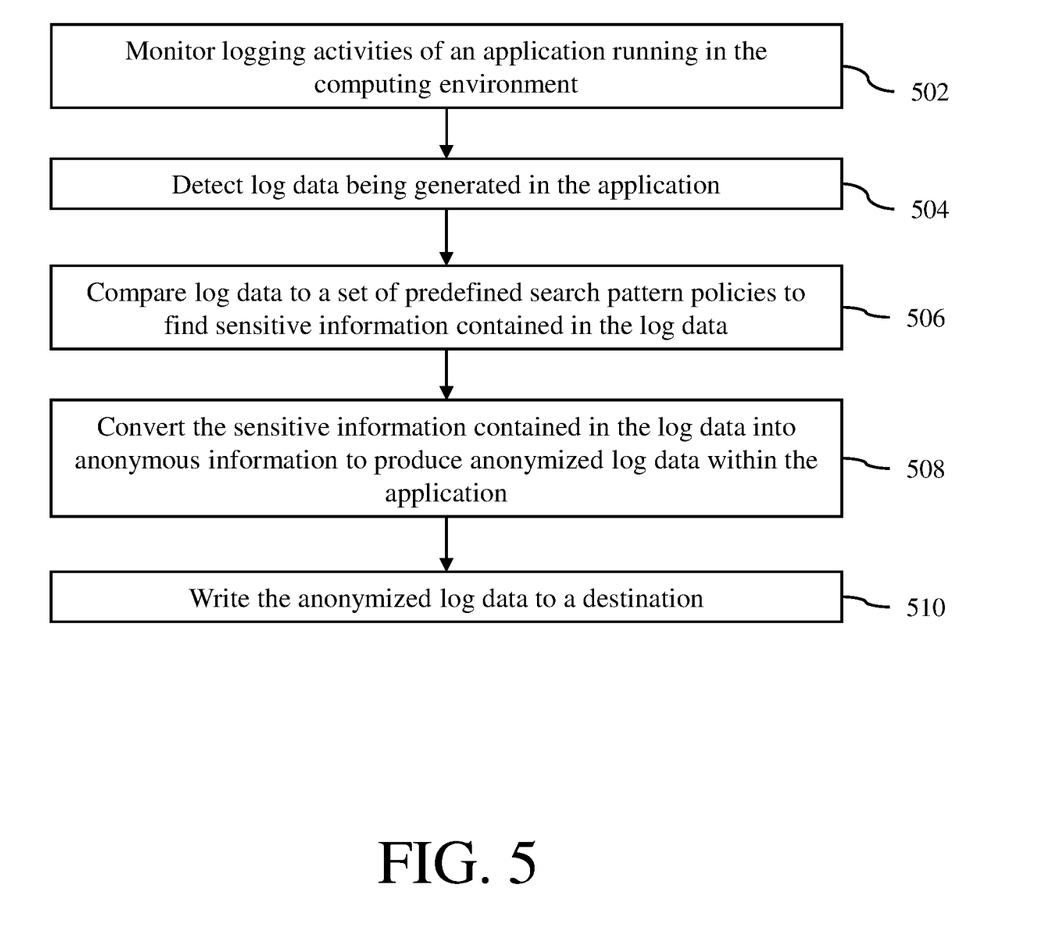
FIG. 5 is a process flow diagram of a computer-implemented method for anonymizing logs generated in applications running in a computing environment in accordance with an embodiment of the invention.

A computer-implemented method for anonymizing logs generated in applications running in a computing environment in accordance with an embodiment of the invention is described with reference to a process flow diagram of FIG. 5. At block 502, logging activities of an application running in the computing environment are monitored. At block 504, log data being generated in the application is detected. At block 506, the log data is compared to a set of predefined search pattern policies to find sensitive information contained in the log data. At block 508, the sensitive information contained in the log data is converted into anonymous information to produce anonymized log data within the application. At block 510, the anonymized log data is written to a destination.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method, comprising:
monitoring, with a secure log module of an application running in a virtual computing instance in a software-defined data center (SDDC), logging activities of a logging module of the application, the virtual computing running on a virtualization software platform, the virtualization software platform running on a host computing system and sharing hardware resources of the host computing system with the virtual computing instance;
detecting, with the secure log module, log data being generated in the application;
comparing, with the secure log module, the log data to a set of predefined search pattern policies to find sensitive information contained in the log data;
converting, with the secure log module, the sensitive information contained in the log data into anonymous information to produce anonymized log data within the application; and
writing, with the secure log module, the anonymized log data to a destination.

2. The computer-implemented method of claim 1, wherein writing the anonymized log data includes writing the anonymized log data to a log file or a console.

3. The computer-implemented method of claim 1, wherein the virtual computing instance is a virtual machine (VM), and wherein the virtualization software platform comprises a hypervisor.

4. The computer-implemented method of claim 1, wherein the virtual computing instance is a container, and wherein the virtualization software platform comprises a virtualization platform to support containers.

5. The computer-implemented method of claim 1, wherein the logging module is based on Logback or Log4J logging framework and the secure log module is implemented to support the Logback or Log4J logging framework.

6. The computer-implemented method of claim 1, wherein the secure log module is a plugin software installed in the application.

7. The computer-implemented method of claim 1, wherein the set of predefined search pattern policies includes regular expressions to detect the sensitive information.

8. The computer-implemented method of claim 7, wherein the regular expressions include user-defined regular expressions.

9. A non-transitory computer-readable storage medium containing program instructions executable by one or more processors to perform operations comprising:
monitoring, with a secure log module of an application running in a virtual computing instance in a software-defined data center (SDDC), logging activities of a logging module of the application, the virtual computing running on a virtualization software platform, the virtualization software platform running on a host computing system and sharing hardware resources of the host computing system with the virtual computing instance;
detecting, with the secure log module, log data being generated in the application;

comparing, with the secure log module, the log data to a set of predefined search pattern policies to find sensitive information contained in the log data;
converting, with the secure log module, the sensitive information contained in the log data into anonymous information to produce anonymized log data within the application; and
writing, with the secure log module, the anonymized log data to a destination.

10. The non-transitory computer-readable storage medium of claim 9, wherein writing the anonymized log data includes writing the anonymized log data to a log file or a console.

11. The non-transitory computer-readable storage medium of claim 9, wherein the virtual computing instance is a virtual machine (VM), and wherein the virtualization software platform comprises a hypervisor.

12. The non-transitory computer-readable storage medium of claim 9, wherein the virtual computing instance is a container, and wherein the virtualization software platform comprises a virtualization platform to support containers.

13. The non-transitory computer-readable storage medium of claim 9, wherein the logging module is based on Logback or Log4J logging framework and the secure log module is implemented to support the Logback or Log4J logging framework.

14. The non-transitory computer-readable storage medium of claim 9, wherein the secure log module is a plugin software installed in the application.

15. The non-transitory computer-readable storage medium of claim 9, wherein the set of predefined search pattern policies includes regular expressions to detect the sensitive information.

16. The non-transitory computer-readable storage medium of claim 15, wherein the regular expressions include user-defined regular expressions.

17. A system comprising:
at least one processor; and
a non-transitory computer-readable storage medium containing program instructions executable by the at least one processor to perform operations comprising:
monitoring, with a secure log module of an application running in a virtual computing instance in a software-defined data center (SDDC), logging activities of a logging module of the application, the virtual computing running on a virtualization software platform, the virtualization software platform running on a host computing system and sharing hardware resources of the host computing system with the virtual computing instance;
detecting, with the secure log module, log data being generated in the application;
comparing, with the secure log module, the log data to a set of predefined search pattern policies to find sensitive information contained in the log data;
converting, with the secure log module, the sensitive information contained in the log data into anonymous information to produce anonymized log data within the application; and
writing, with the secure log module, the anonymized log data to a destination.

18. The system of claim 17, wherein writing the anonymized log data includes writing the anonymized log data to a log file or a console.

19. The system of claim 17, wherein the set of predefined search pattern policies includes regular expressions to detect the sensitive information.

20. The system of claim 19, wherein the regular expressions include user-defined regular expressions.

* * * * *